United States Patent
Isobe et al.

(10) Patent No.: US 6,556,518 B2
(45) Date of Patent: Apr. 29, 2003

(54) OPTICAL DISK RECORDING APPARATUS AND METHOD

(75) Inventors: Hidetake Isobe, Tokorozawa (JP); Ikuomi Natori, Tokorozawa (JP)

(73) Assignee: Teac Corporation, Tokyo (JP)

( * ) Notice: Subject to any disclaimer, the term of this patent is extended or adjusted under 35 U.S.C. 154(b) by 169 days.

(21) Appl. No.: 09/846,862

(22) Filed: May 1, 2001

(65) Prior Publication Data

US 2001/0038579 A1 Nov. 8, 2001

(30) Foreign Application Priority Data

May 2, 2000 (JP) ........................................ 2000-133645

(51) Int. Cl.[7] .............................................. G11B 17/22
(52) U.S. Cl. ................................ 369/30.19; 369/30.05; 369/84; 369/47.12
(58) Field of Search ............................ 369/30.11, 30.1, 369/30.03, 275.3, 47.54, 47.12, 47.13, 85, 84, 59.25, 59.26, 30.19, 30.05, 53.24, 47.23, 53.18; 360/15, 72.1, 72.2

(56) References Cited

U.S. PATENT DOCUMENTS 5,311,492 A * 5/1994 Tabuchi et al.
5,414,688 A * 5/1995 Inokuchi
5,943,311 A * 8/1999 Takenaka
6,272,088 B1 * 8/2001 Aramaki et al.
6,388,959 B1 * 5/2002 Kondo
6,388,965 B2 * 5/2002 Ozawa et al.
6,493,299 B2 * 12/2002 Sato

FOREIGN PATENT DOCUMENTS

JP          5-174548          7/1993

* cited by examiner

Primary Examiner—Ali Neyzari
(74) Attorney, Agent, or Firm—Anderson Kill & Olick; Eugene Lieberstein; Michael N. Meller

(57) ABSTRACT

An optical disk recording apparatus for recording a main information signal reproduced from a first optical disk on a second optical disk includes a first part which set an address of a start point of each of tracks of the first optical disk and an address of a position ahead of the start point by a predetermined period of time, a second part which searches a part between the start point and the position ahead of the start point of each of the tracks for an address within a range where each of index values included in subcodes reproduced with the main information signal is zero, and a third part which, with respect to each of the tracks, sets the index values within the range to zero and index values other than the index values within the range to a predetermined value other than zero, and records the index values on the second optical disk together with the main information signal.

6 Claims, 5 Drawing Sheets

FIG. 3

| TNO | Idx | ... | Min | Sec | Fr | |
|-----|-----|-----|-----|-----|-----|---|
| | | : | | | | |
| 01 | 00 | | 00 | 00 | 00 | |
| 01 | 01 | | 00 | 02 | 00 | ⇐ B of TRACK 01 |
| 02 | 00 | | 04 | 30 | 15 | ← A of TRACK 02 |
| 02 | 01 | | 04 | 32 | 15 | ⇐ B of TRACK 02 |
| 03 | 01 | | 07 | 41 | 22 | ⇐ B of TRACK 03 |
| | : | | : | | | |
| 12 | 00 | | 51 | 23 | 15 | ← A of TRACK 12 |
| 12 | 01 | | 51 | 26 | 15 | ⇐ B of TRACK 12 |
| AA | 01 | | 56 | 37 | 46 | ← LEAD-OUT START ADDRESS |

OPTICAL DISK RECORDING APPARATUS AND METHOD

BACKGROUND OF THE INVENTION

1. Field of the Invention

The present invention generally relates to optical disk recording apparatuses and methods, and more particularly to an optical disk recording apparatus and an optical disk recording method which duplicate a compact disk (CD) by reproducing data from the compact disk and writing the data onto an optical disk such as a compact disk recordable (CD-R).

2. Description of the Related Art

Conventionally, an optical disk recording apparatus called a CD duplicator has been used to duplicate a CD by reproducing data from the compact disk and writing the data onto a CD-R.

The compact disk is recorded with subcodes such as a track number (TNO), an index number, a relative time (an elapsed time in a track), and an absolute time corresponding to an address in addition to main information such as music programs. Usually, a value of the index number (an index value) is 0 for a few seconds right before the start of each track corresponding to a movement, and thereafter is sequentially incremented, for instance, at a pause between sections.

The conventional CD duplicator shortens a time spent in making a duplication of the CD by leaving out the reading of the index number included in the above-described subcodes, which number is not related to the main information and is not utilized so often. The conventional CD duplicator sets the index value to 0 with respect to each two seconds right before the start of each track and to 1 with respect to each track after each two seconds provided with the index value 0. The index values are then written to the CD-R. The absolute time (address) of the start of each track is read but from TOC (Table of Contents) recorded as index information in the lead-in area of the CD, which area is located closest to the center thereof.

In a conventional CD, a silent part, or a pause, is interposed between each two tracks (movements), and the index value 0 is set in the pause. Therefore, if a specified track is reproduced by a conventional reproduction apparatus, the reproduction is stopped when the index value 0 is detected at the end of the track.

However, in a CD recorded with no pause between any two tracks due to a live recording, the part of a track having the last index value XX, which is a value other than 0, is followed by a part of the subsequent track having the index value 1 without the index value 0 being set in between any two tracks. Therefore, if such a CD having no pause is duplicated by the conventional CD duplicator, a duplicate CD-R is obtained with the index value being set to 0 for each two seconds right before the start of each track, or each last two seconds of a track preceding each track.

Therefore, in the case of reproducing a specified track, or a movement, of this CD-R, which track is followed by a subsequent track without a pause interposed therebetween, by the conventional reproduction apparatus, the last two seconds of the track, is not reproduced, thus preventing a listener from listening to a part of the movement corresponding to the last two seconds.

SUMMARY OF THE INVENTION

It is a general object of the present invention to provide an optical disk recording apparatus and an optical disk recording method in which the above-described disadvantage is eliminated.

A more specific object of the present invention is to provide an optical disk recording apparatus and an optical disk recording method which prevent a time spent in duplication from getting longer and duplicate a CD so that at a time of reproducing a specified track, the last part of the track is reproducible.

The above objects of the present invention are achieved by an optical disk recording apparatus for recording a main information signal reproduced from a first optical disk on a second optical disk, which apparatus includes a first part which set an address of a start point of each of tracks of the first optical disk and an address of a position ahead of the start point by a predetermined period of time, a second part which searches a part between the start point and the position ahead of the start point of each of the tracks for an address within a range where each of index values included in subcodes reproduced with the main information signal is zero, and a third part which, with respect to each of the tracks, sets the index values within the range to zero and index values other than the index values within the range to a predetermined value other than zero, and records the index values on the second optical disk together with the main information signal.

The above objects of the present invention are also achieved by a method of recording a main information signal reproduced from a first optical disk on a second optical disk, which method includes the steps of (a) setting an address of a start point of each of tracks of the first optical disk and an address of a position ahead of the start point by a predetermined period of time, (b) searching a part between the start point and the position ahead of the start point of each of the tracks for an address within a range where each of index values included in subcodes reproduced with the main information signal is zero, and (c) setting, with respect to each of the tracks, the index values within the range to zero and index values other than the index values within the range to a predetermined value other than zero and recording the index values on the second optical disk together with the main information signal.

The above-described apparatus and method can minimizes a time required to read out the indexes from a source optical disk, thus preventing a time required to duplicate the source optical disk from getting longer. Further, the above-described apparatus and method can duplicate the source optical disk so that a duplicate has no part of an index value 0 in between each two tracks, or movements, if the source CD includes no pause in between each two tracks. Therefore, in the case of reproducing a specified track, the last part of the track is reproducible.

BRIEF DESCRIPTION OF THE DRAWINGS

Other objects, features and advantages of the present invention will become more apparent from the following detailed description when read in conjunction with the accompanying drawings, in which:

FIG. 3 is a diagram showing an example of a cue sheet according to the embodiment of the present invention;

DETAILED DESCRIPTION OF THE PREFERRED EMBODIMENTS

A description will now be given, with reference to the accompanying drawings, of an embodiment of the present invention.

Figure 1:
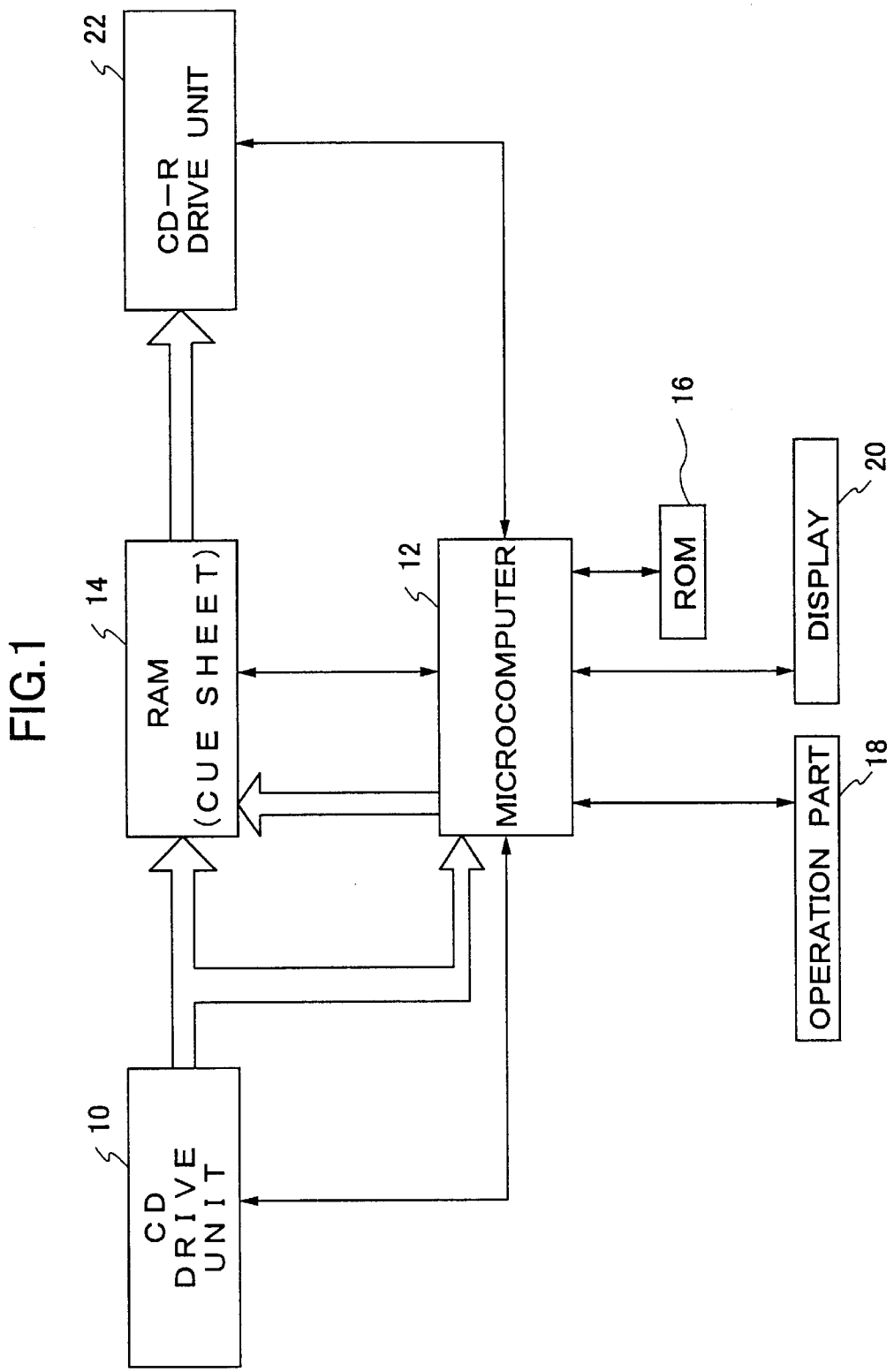
FIG. 1 is a block diagram of an optical disk recording apparatus according to an embodiment of the present invention.

FIG. 1 is a block diagram of an optical disk recording apparatus according to the embodiment of the present invention. The optical disk recording apparatus is a CD duplicator. In FIG. 1, a CD drive unit 10 reproduces data from a source CD to be duplicated in accordance with read commands supplied from a microcomputer 12 so as to supply TOC recorded in the lead-in area of the CD and subcodes to the microcomputer 12, and to supply the TOC, the subcodes and a main information signal to a RAM 14.

The microcomputer 12 executes an operation program stored in a ROM 16 so as to supply the read commands to the CD drive unit 10 and a write command to a CD-R drive unit 22, and to create a cue sheet in the RAM 14 and transfer the cue sheet to the CD-R drive unit 22. An instruction such as an operation mode is input from an operation part 18 to be supplied to the microcomputer 12. Further, the microcomputer 12 displays the operation mode, the reproduction state of the CD, and the recording state of a CD-R on a display 20.

Figure 2:
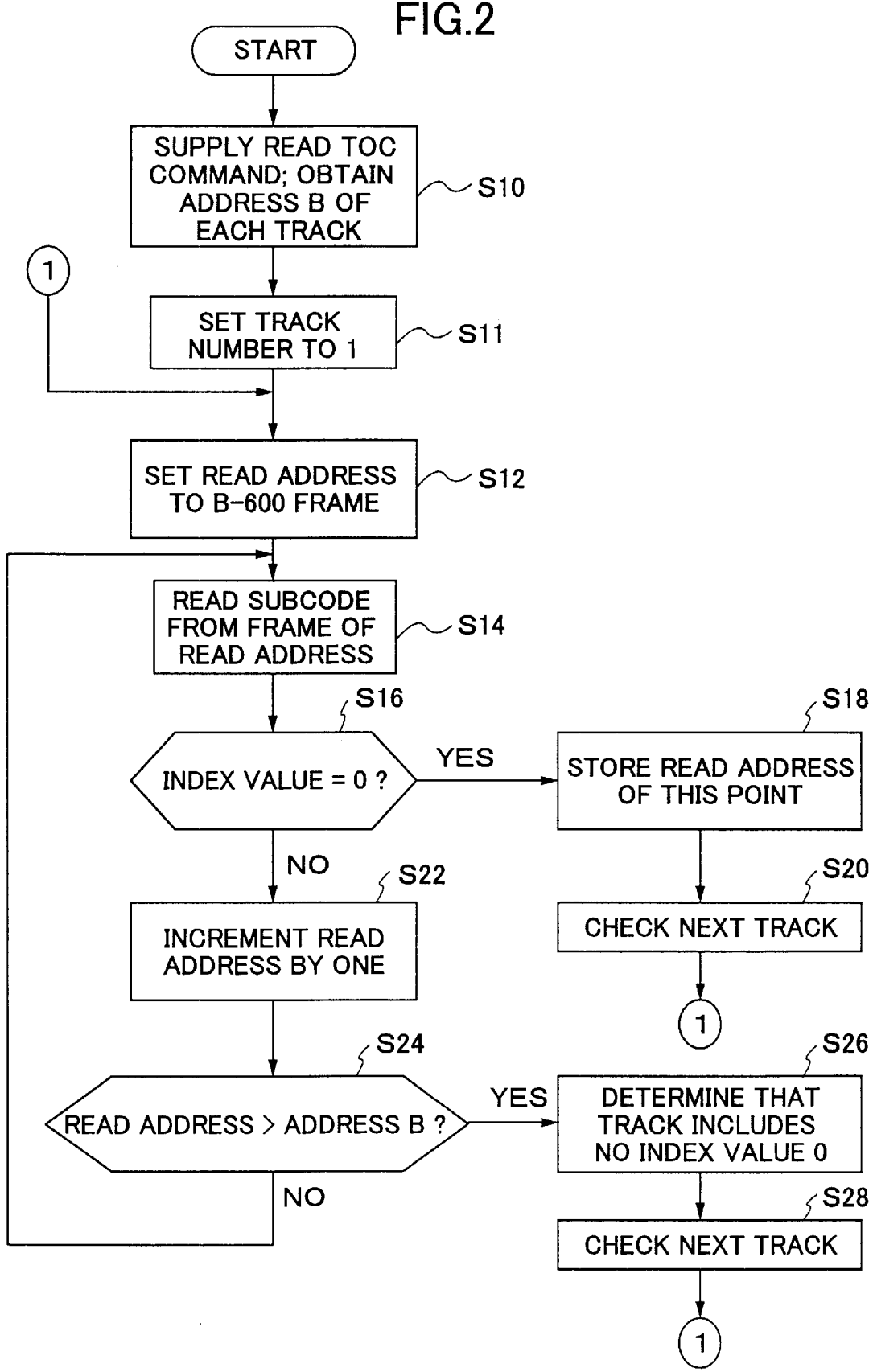
FIG. 2 is a flowchart of a cue sheet creating operation performed by a microcomputer of the optical disk recording apparatus at a time of duplicating a CD.

FIG. 2 is a flowchart of a cue sheet creating operation performed by the microcomputer 12 at a time of duplicating the CD according to the embodiment of the present invention. In step S10 of FIG. 2, the microcomputer 12 supplies a read TOC command to the CD drive unit 10 so that the CD drive unit 10 reads out the TOC from the CD loaded thereinto. Thereby, the absolute time (address) B of the start point of each track, which time is recorded in the TOC, is supplied to the microcomputer 12. Here, a silent part, or a pause, is excluded from each track. Next, in step S11, the number of a track (a track number) is set to 1, and the operation proceeds to step S12.

In step S12, a read address is set to a B-600 frame, which is 600 frames ahead of the absolute time (address) B of the start point of the track. The 600 frames correspond to eight seconds of reproduction. The number of frames is not limited to 600, and, for instance, any number corresponding to more than two seconds of reproduction may be employed.

Next, in step S14, a subcode is read out from the frame of the above-described read address of the loaded CD, and in step S16, it is determined whether an index value included in the read subcode is 0. If the index value is 0, the operation proceeds to step S18, where the read address at this point is stored as an absolute time A of the start point of the index value 0 of the track or of the start point of a pause in the beginning of the track. Then, in step S20, the track number is incremented by one, and the operation proceeds to step S12 for checking the next track. If the next track number is not included in the TOC at this point, the operation ends.

On the other hand, if it is determined in step S16 that the index value is not 0, in step S22, the read address is incremented by one, and in step S24, it is determined whether the read address is greater than the absolute time (address) B of the start point of the track excluding a pause. If it is determined in step S24 that the read address is not greater than the absolute time (address) B, the operation returns to step S14 to repeat steps S14 through S24. If it is determined in step S24 that the read address is greater than the absolute time (address) B, in step S26, it is determined that the track does not include the index value 0. Then, in step S28, the track number is incremented by one, and the operation proceeds to step s28 for checking the next track. If the next track number is not included in the TOC at this point, the operation ends.

By this operation, the cue sheet shown in FIG. 3 is created in the RAM 14. In this cue sheet, the absolute time (address) A that is a recording start address of the index value 0 and the absolute time (address) B that is a recording start address of the index value 1 are preset with respect to each track. Each of the absolute times A and B is expressed in minutes (Min), seconds (Sec), and a frame number (Fr)

Figure 4:
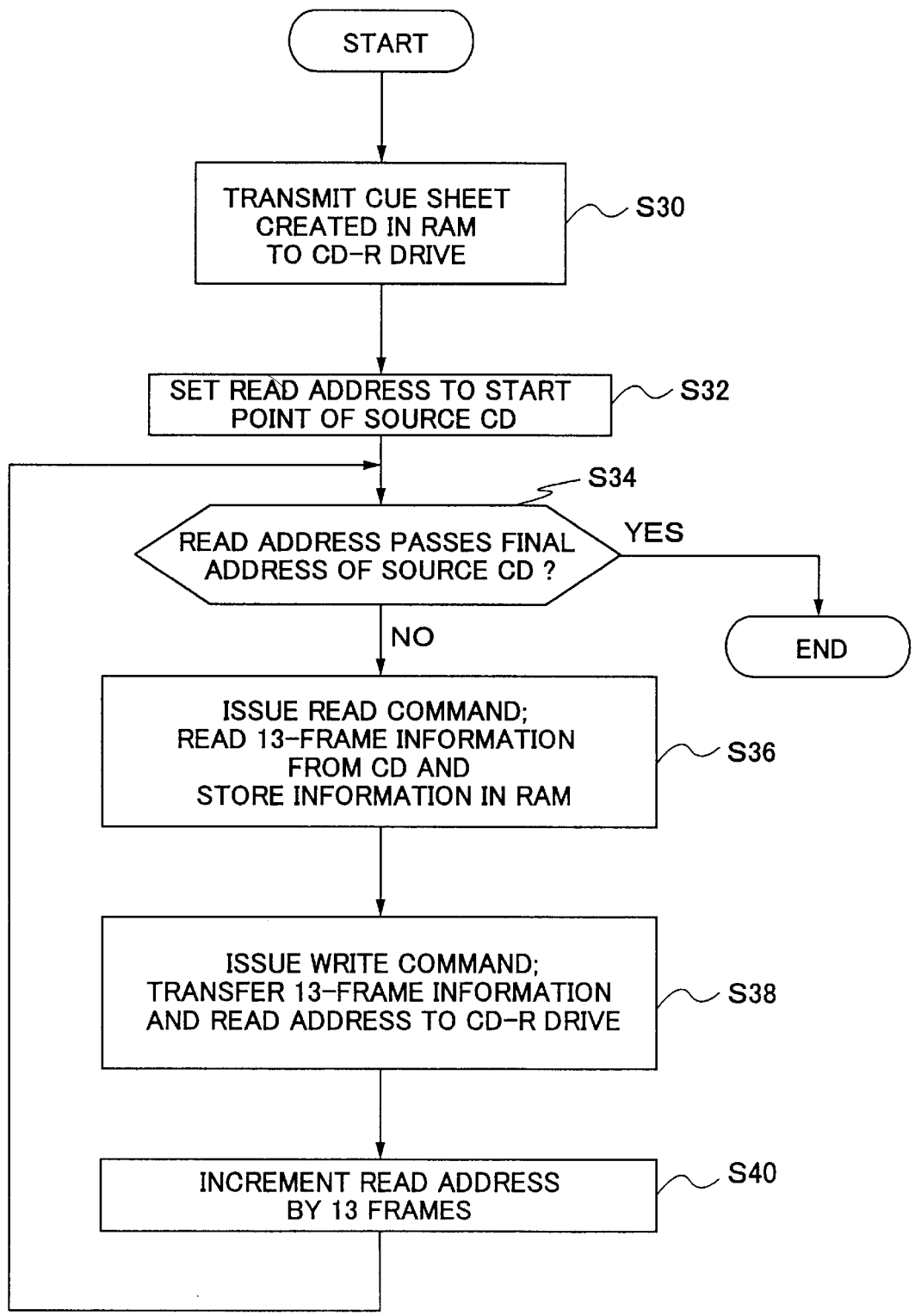
FIG. 4 is a flowchart of a duplication operation performed by the microcomputer.

FIG. 4 is a flowchart of a duplication operation performed by the microcomputer 12. In step S30 of FIG. 4, the microcomputer 12 issues a send-cue-sheet command so as to transmit the cue sheet created in the RAM 14 to the CDR drive unit 22. Next, in step S32, the read address is first set to the start point of the source CD loaded into the CD drive unit 10.

Next, in step S34, it is determined whether the read address passes the final address of the source CD. If it is determined in step S34 that the read address passes the final address of the source CD, the operation ends. If it is not so determined in step S34, the operation proceeds to step S36, where the microcomputer 12 issues the read command so that a part of the main information signal corresponding to 13 frames is read out from the source CD to be stored in the RAM 14.

Next, in step S38, the microcomputer 12 issues the write command to transfer the part of the main information signal to the CD-R drive unit 22, which successively writes the transferred part of the main information signal to the CD-R. The read address of the source CD is employed, as it is, as the write address of the CD-R. At this point, the CD-R drive unit 22 sets and records the index value of each frame on the CD-R based on the cue sheet that the CD-R drive unit 22 has received. Thereafter, in step S40, the microcomputer 12 increments the read address by 13 frames. Then, the operation returns to step S34 to repeat the above-described steps S34 through S40 so as to duplicate the source CD.

Figure 5:
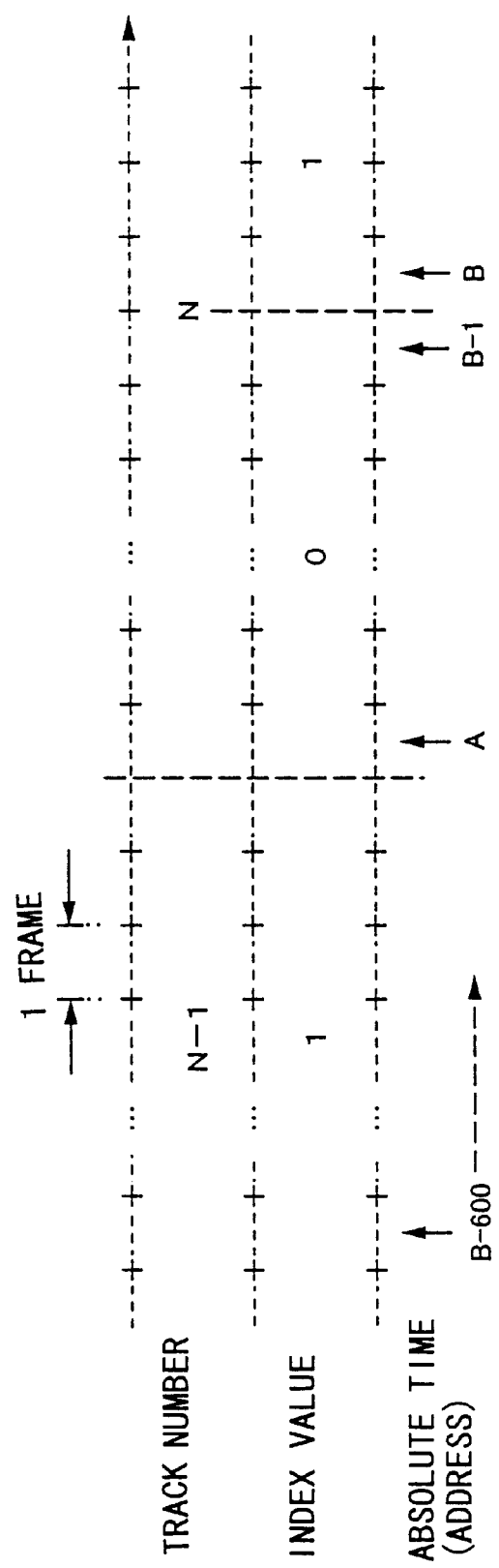
FIG. 5 is a diagram showing an index value of each frame at a boundary between tracks N–1 and N according to the embodiment of the present invention.

FIG. 5 is a diagram showing the index value of each frame at a boundary between tracks N–1 and N.

As a result of the above-described operations, in the duplicate CD-R, the index value of each frame of the end part of the track N–1 becomes 1 at the boundary between the tracks N–1 and N shown in FIG. 5. Further, only the frames having the index value 0 of the frames of the beginning of the track N of the source CD have their index values duplicated in the CD-R, and the subsequent frames of the track N are provided with the index value 1 in the CD-R. That is, in the beginning of each track, only the frames having the index value 0 have their index values duplicated in the CD-R as they are.

Therefore, if a CD having no pause between any two tracks due to a live recording is duplicated in a CD-R by using the CD duplicator according to the present invention, each frame of the end part of each track has the index value 1, and each frame of the beginning of each subsequent track has the index value 1. Accordingly, no frame having the index value 0 is recorded between each two tracks.

Therefore, in the case of reproducing a specified track of this CD-R, which track is followed by a subsequent track without a pause interposed therebetween, by the conventional reproduction apparatus, the track can be reproduced until its end.

According to the CD duplicator of the present invention, in searching each track of the source CD for an address within a range of the index value 0, only a part between the start point of each track and a position ahead of the start point by a predetermined period of time. Therefore, a time required to read indexes from the source CD can be minimized, thus shbrtening a time required to duplicate the source CD.

The main information signal is not limited to audio data, but can be any kind of digital data.

The above-described steps S10 and S12, S14 through S28, and S30 through S40 correspond to first, second, and third parts of an optical disk recording apparatus according to the present invention, respectively, and to steps (a) through (c) of an optical disk recording method according to the present invention, respectively.

The present invention is not limited to the specifically disclosed embodiment, but variations and modifications may be made without departing from the scope of the present invention.

The present application is based on Japanese priority application No. 2000-133645 filed on May 2, 2000, the entire contents of which are hereby incorporated by reference.

What is claimed is:

1. An optical disk recording apparatus for recording a main information signal reproduced from a first optical disk on a second optical disk, the optical disk recording apparatus comprising:

a first part which sets an address of a start point of each of tracks of the first optical disk and an address of a position ahead of the start point by a predetermined period of time;

a second part which searches a part between the start point and the position ahead of the start point of each of the tracks for an address within a range where each of index values included in subcodes reproduced with the main information signal is zero; and a third part which, with respect to each of the tracks, sets the index values within the range to zero and index values other than the index values within the range to a predetermined value other than zero, and records the index values on the second optical disk together with the main information signal.

2. The apparatus as claimed in claim 1, wherein:

the main information signal is reproduced in a reproduction part and is recorded in a recording part; and said first part sets the addresses based on index information reproduced from the first optical disk in the reproduction part.

3. The apparatus as claimed in claim 1, wherein the second optical disk is an optical disk recordable.

4. A method of recording a main information signal reproduced from a first optical disk on a second optical disk, the method comprising the steps of:

(a) setting an address of a start point of each of tracks of the first optical disk and an address of a position ahead of the start point by a predetermined period of time;

(b) searching a part between the start point and the position ahead of the start point of each of the tracks for an address within a range where each of index values included in subcodes reproduced with the main information signal is zero; and (c) setting, with respect to each of the tracks, the index values within the range to zero and index values other than the index values within the range to a predetermined value other than zero and recording the index values on the second optical disk together with the main information signal.

5. The method as claimed in claim 4, wherein:

the main information signal is reproduced in a reproduction part and is recorded in a recording part; and said step (a) sets the addresses based on index information reproduced from the first optical disk in the reproduction part.

6. The apparatus as claimed in claim 4, wherein the second optical disk is an optical disk recordable.

* * * * *